United States Patent
Tsujimoto et al.

(10) Patent No.: US 7,566,071 B2
(45) Date of Patent: Jul. 28, 2009

(54) STEERING WHEEL WITH AIRBAG APPARATUS

(75) Inventors: Kei Tsujimoto, Tokyo (JP); Wataru Nakazawa, Tokyo (JP)

(73) Assignee: Takata Corporation, Tokyo (JP)

( * ) Notice: Subject to any disclaimer, the term of this patent is extended or adjusted under 35 U.S.C. 154(b) by 349 days.

(21) Appl. No.: 11/371,979

(22) Filed: Mar. 10, 2006

(65) Prior Publication Data
US 2006/0208470 A1     Sep. 21, 2006

(30) Foreign Application Priority Data

| Mar. 16, 2005 | (JP) | ............................... 2005-075355 |
| Jul. 22, 2005 | (JP) | ............................... 2005-213018 |
| Nov. 11, 2005 | (JP) | ............................... 2005-327698 |

(51) Int. Cl.
B60R 21/203      (2006.01)
(52) U.S. Cl. .................................................. 280/731
(58) Field of Classification Search .............. 280/728.2, 280/728.3, 731; 200/61.54, 61.55
See application file for complete search history.

(56) References Cited

U.S. PATENT DOCUMENTS

| 5,380,037 | A | 1/1995 | Worrell et al. |
| 5,775,725 | A | 7/1998 | Hodac et al. |
| 5,947,509 | A | 9/1999 | Ricks et al. |
| 6,092,832 | A | 7/2000 | Worrell et al. |
| 6,196,573 | B1 | 3/2001 | Worrell et al. |
| 6,276,711 | B1 * | 8/2001 | Kurz et al. ................ 280/728.2 |
| 6,554,312 | B2 | 4/2003 | Sakane et al. |
| 6,565,113 | B2 | 5/2003 | Kassman et al. |
| 6,688,638 | B2 * | 2/2004 | Schutz ..................... 280/728.2 |
| 6,874,808 | B2 | 4/2005 | Marath et al. |
| 7,059,631 | B2 * | 6/2006 | Schorle et al. .............. 280/731 |
| 7,108,276 | B2 * | 9/2006 | Schutz et al. ............ 280/728.2 |
| 7,118,125 | B2 * | 10/2006 | Lee ............................ 280/731 |
| 2002/0043786 | A1 | 4/2002 | Schutz |
| 2002/0074781 | A1 | 6/2002 | Schutz et al. |
| 2003/0173759 | A1 * | 9/2003 | Grenier ................... 280/728.2 |
| 2004/0017068 | A1 | 1/2004 | Weis et al. |
| 2004/0075249 | A1 | 4/2004 | Keutz et al. |
| 2004/0084881 | A1 | 5/2004 | Helmstetter |

FOREIGN PATENT DOCUMENTS

| EP | 1 400 414 A2 | 3/2004 |
| EP | 1 491 412 A1 | 12/2004 |
| JP | 2001-151060 | 6/2001 |
| JP | 2001-163146 | 6/2001 |

* cited by examiner

*Primary Examiner*—Paul N. Dickson
*Assistant Examiner*—Robert A. Coker
(74) *Attorney, Agent, or Firm*—Manabu Kanesaka

(57) ABSTRACT

An airbag apparatus is mounted to a front surface side of a base member of a steering wheel so as to be capable of advancing and retracting in the direction of an axial line of a steering column. A mounting strip projects upright from a back surface of a retainer of the airbag apparatus. The base member is formed with a mounting strip insertion hole, so that the retainer is connected to the base member by pushing the mounting strip into the mounting strip insertion hole and engaging the mounting strip with an engaging spring. The steering wheel and airbag apparatus is simple in structure, and has reduced weight.

10 Claims, 18 Drawing Sheets

STEERING WHEEL WITH AIRBAG APPARATUS

BACKGROUND OF THE INVENTION AND RELATED ART STATEMENT

The present invention relates to a steering wheel with an airbag apparatus and, in particular, to a steering wheel with an airbag apparatus configured to sound a horn by pressing the airbag apparatus. More specifically, the present invention relates to a steering wheel with an airbag apparatus in which the airbag apparatus is mounted to the steering wheel via a one-touch mounting mechanism.

A steering wheel with an airbag apparatus in which the airbag apparatus is mounted to the steering wheel with a one-touch mechanism and a horn that sounds by pressing the airbag apparatus is disclosed in Japanese Unexamined Patent Application Publication No. 2002-225665.

In Japanese Unexamined Patent Application Publication No. 2002-225665, the airbag apparatus includes a retainer (in the aforementioned patent document, it is referred to as a bag holder) including an airbag, an inflator and a module cover mounted thereon, a fixed contact plate arranged on the back side of the retainer, and a horn switch mechanism which is provided between the fixed contact plate and the retainer. The fixed contact plate is fixed to the steering wheel via the one-touch mounting mechanism formed of a snap-lock mechanism.

The horn switch mechanism is provided with a coil spring that urges the retainer and the fixed contact plate in the direction away from each other, and when the module cover is pressed with a hand, the retainer is retracted integrally with the module cover, whereby the contact point of the horn switch comes into contact to turn the horn switch ON. When the hand is moved apart from the module cover, the module cover and the retainer are moved back (advances) to the original position by a repulsive force of the coil spring.

In the structure disclosed in the Japanese Unexamined Patent Application Publication No. 2002-225665, the fixed contact plate is integrally formed with the airbag apparatus via the horn switch mechanism, and the fixed contact plate as an excessive member increases the number of components, and hence increases weight and cost.

It is therefore an object of the present invention to provide a steering wheel with an airbag apparatus having a simple structure so that the weight can be reduced in comparison with the device of Japanese Unexamined Patent Application Publication No. 2002-225665.

Further objects and advantages of the invention will be apparent from the following description of the invention and the associated drawings.

SUMMARY OF THE INVENTION

A steering wheel with an airbag apparatus according to one embodiment of the invention includes an airbag apparatus mounted to a steering wheel so as to be capable of advancing and retracting in the direction of an axial line of a steering column, an urging spring for urging the airbag apparatus from the steering wheel toward an occupant; and a horn switch in which contact points move toward/away from each other by advancement and retraction of the airbag apparatus. The airbag apparatus includes a retainer, an airbag mounted to the retainer, an inflator, and a module cover. A mounting strip extending from the retainer is mounted to the steering wheel with a one-touch mounting mechanism so as to be capable of advancing and retracting in the direction of the axial line of the steering column.

According to one aspect of the invention, the one-touch mounting mechanism is a snap-lock mechanism.

According to another aspect of the invention, the mounting strip extends from the retainer substantially in parallel with the axial line, and a claw portion projecting outward from a center side of the retainer is provided on the mounting strip at a distal end in the extending direction, and the snap-block mechanism is provided with a mounting strip engaging spring with which the claw portion is engaged.

In another aspect of the invention, a protruding portion is projected sideways from a side surface of the retainer, and the urging spring is provided so as to urge the protruding portion.

In another aspect of the invention, the protruding portion is provided on the side surface of the retainer on the occupant side.

According to another embodiment of the invention, the mounting strip extends from the retainer substantially in parallel with the axial line, and a claw portion projecting sideway is provided on the mounting strip at the distal end in the extending direction. The snap-lock mechanism includes a mounting strip engaging spring with which the claw portion is engaged and engaging force increasing means that increases an engaging force of the mounting strip engaging spring after having engaged the claw portion with the mounting strip engaging spring.

In another embodiment of the invention, the steering wheel includes a mounting strip insertion hole in which the mounting strip is inserted. The mounting strip engaging spring includes a pair of parallel extending portions extending across the mounting strip insertion hole and substantially in parallel to each other, the claw portion of the mounting strip is engaged with one of the parallel extending portions from the side opposite from the other of the parallel extending portions, and the engaging force increasing means is a spacer inserted between the parallel extending portions for preventing the parallel extending portions from approaching to each other.

In the steering wheel with the airbag apparatus according to the present invention, the mounting strip provided on the retainer is mounted to the steering wheel so as to be capable of advancing and retracting via the one-touch mounting mechanism. Thus, the additional member as the fixed contact plate as described in Japanese Unexamined Patent Application Publication No. 2002-225665 is not necessary. Therefore, the structure is simplified, the weight of the steering wheel with an airbag apparatus can be reduced, and reduction of cost, such as the member cost, can be achieved.

The snap-lock mechanism which provides easy mounting operation is preferable as the one-touch mechanism.

When the claw portion of the mounting strip is provided so as to project outward, the engaging characteristic between the retainer and the steering wheel in the inflating operation of the airbag is improved.

According to the above-described embodiment of the steering wheel with the airbag apparatus in which the protruding portion is provided on the side surface of the retainer on the occupant side, the clearance between the airbag apparatus and a spoke front surface of the steering wheel adjacent to the airbag apparatus can be set to a small clearance. The reason will be described in detail below with reference to FIGS. 11(a) and 11(b) and FIGS. 12(a) and 12(b).

According to the above-described embodiment in which the steering wheel includes a mounting strip insertion hole in which the mounting strip is inserted, the engagement between the mounting strip and the mounting strip engaging spring is stabilized.

DETAILED DESCRIPTION OF THE PREFERRED EMBODIMENTS

Figure 1:
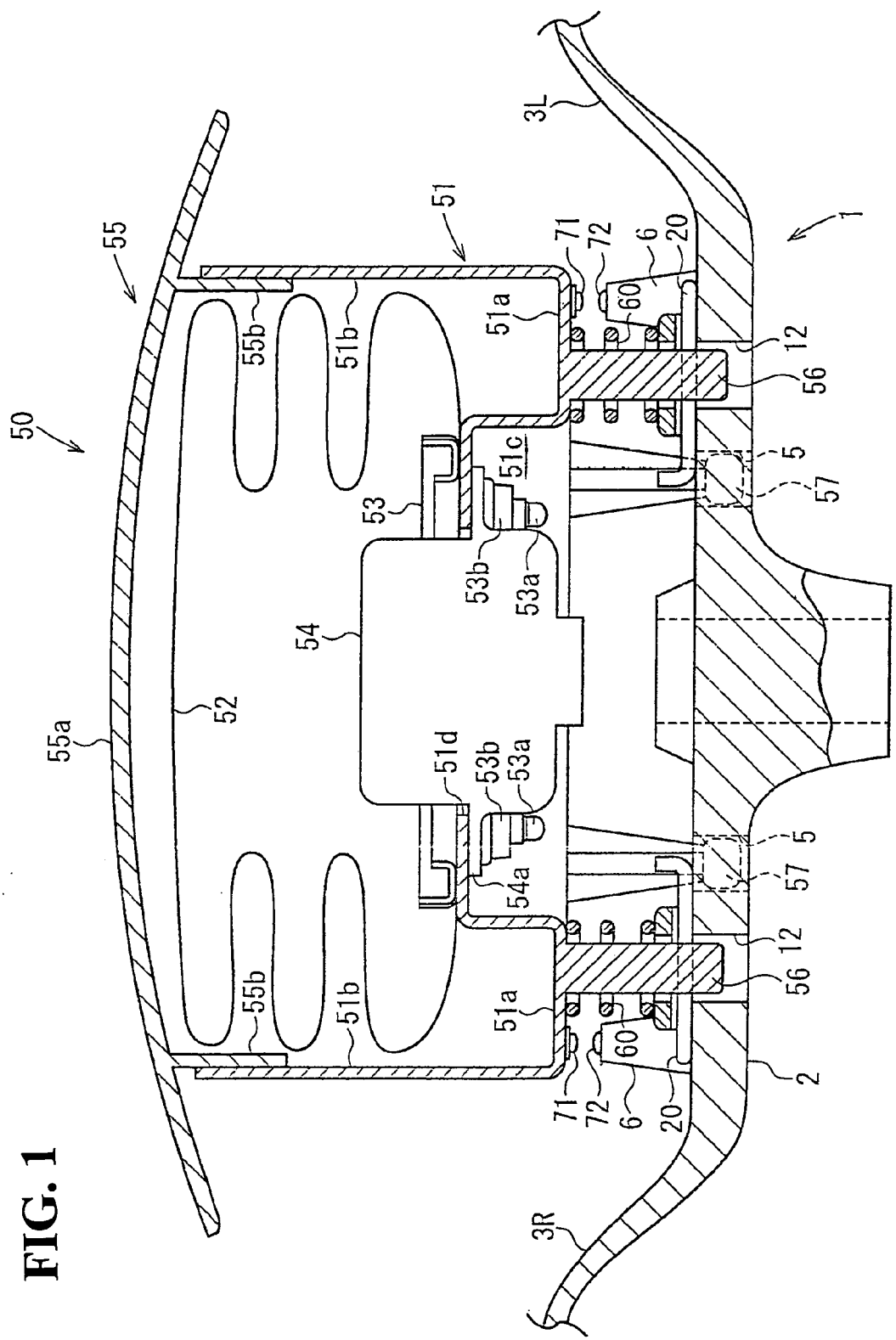
FIG. 1 is a cross-sectional view of a steering wheel with an airbag apparatus according to one embodiment of the invention.

Referring now to the drawings, an embodiment of the present invention will be described.

Figure 2:
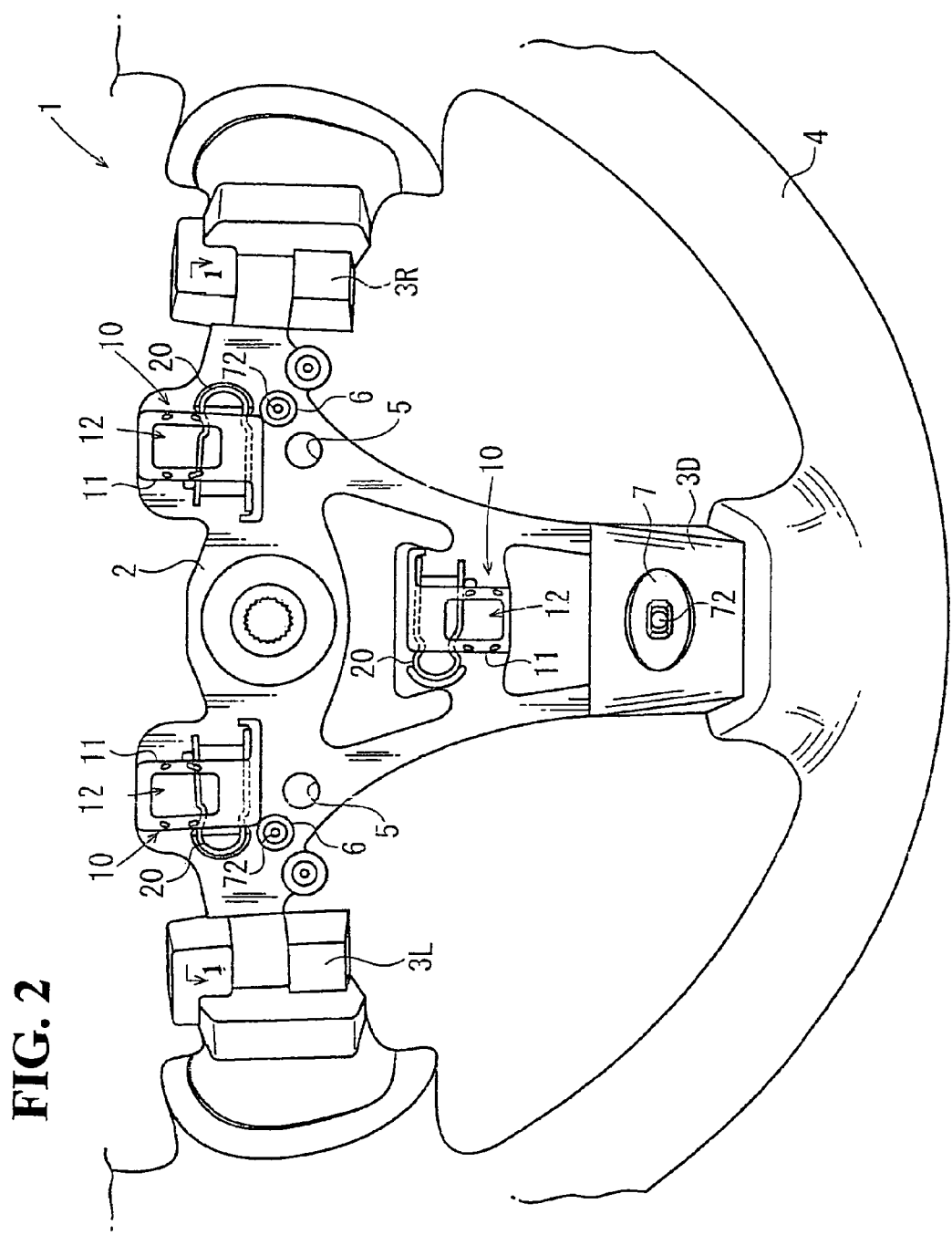
FIG. 2 is a plan view of the steering wheel.
Figure 3:
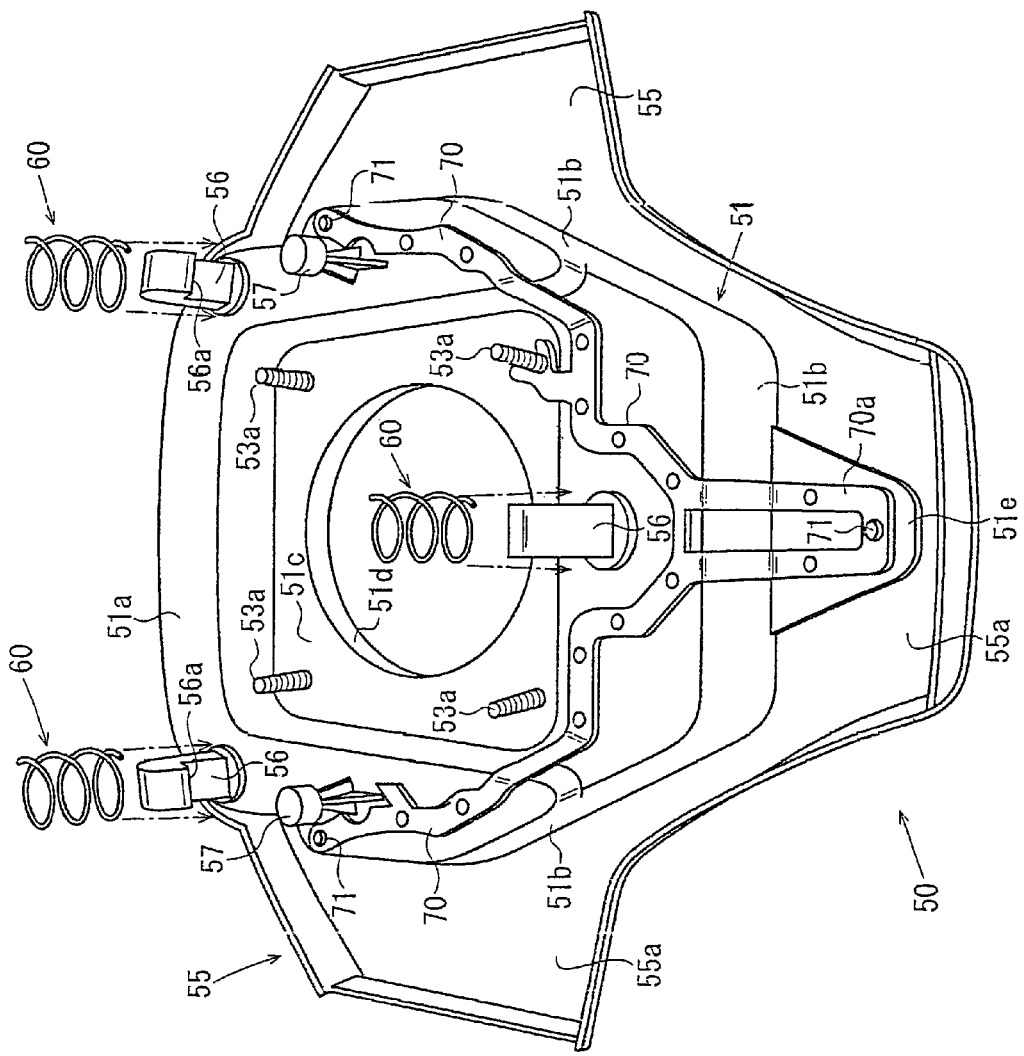
FIG. 3 is a perspective view of the airbag apparatus viewed from the back side.
Figure 4:
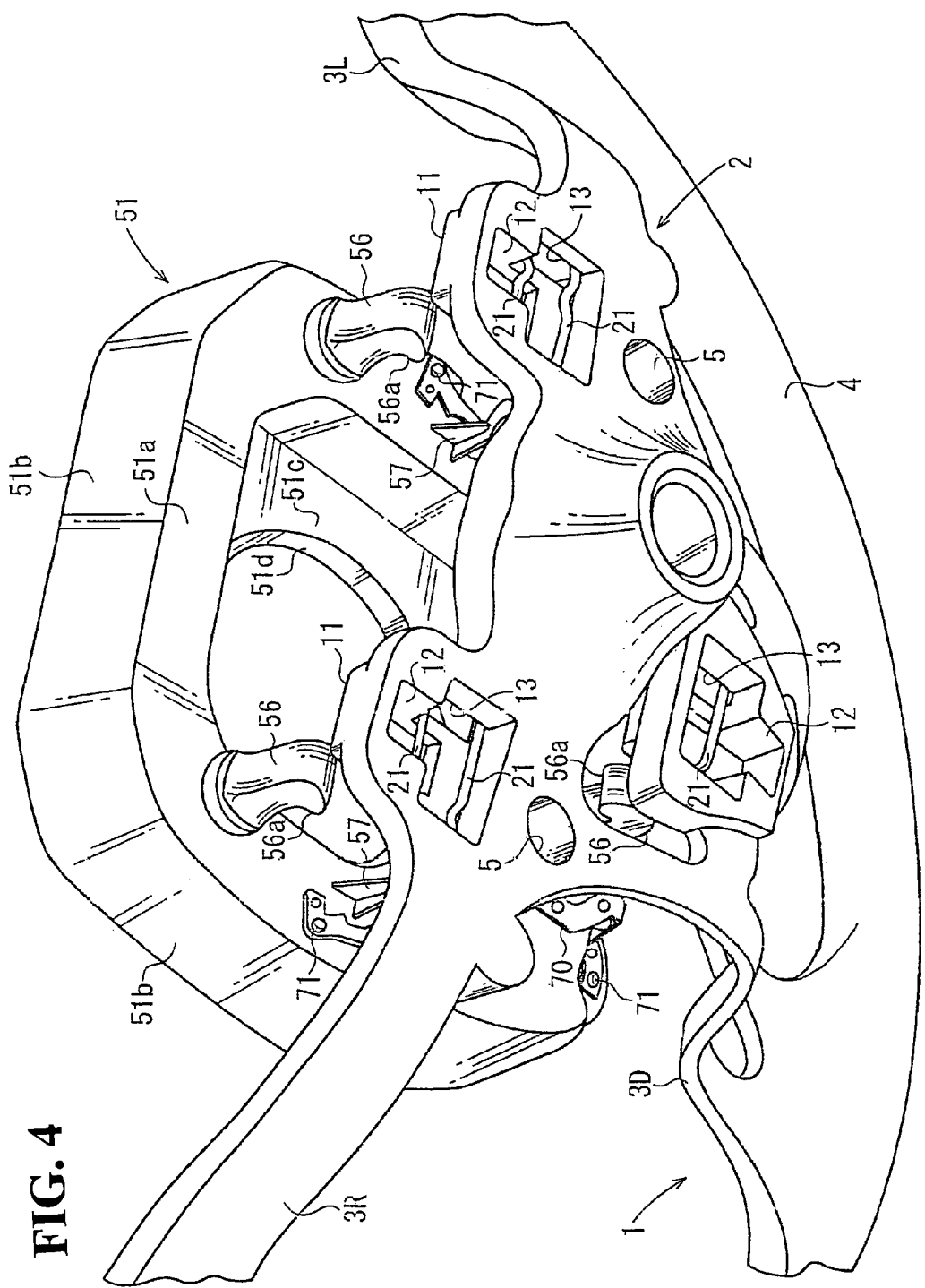
FIG. 4 is an exploded perspective view of the steering wheel viewed from the back side.
Figure 5A:
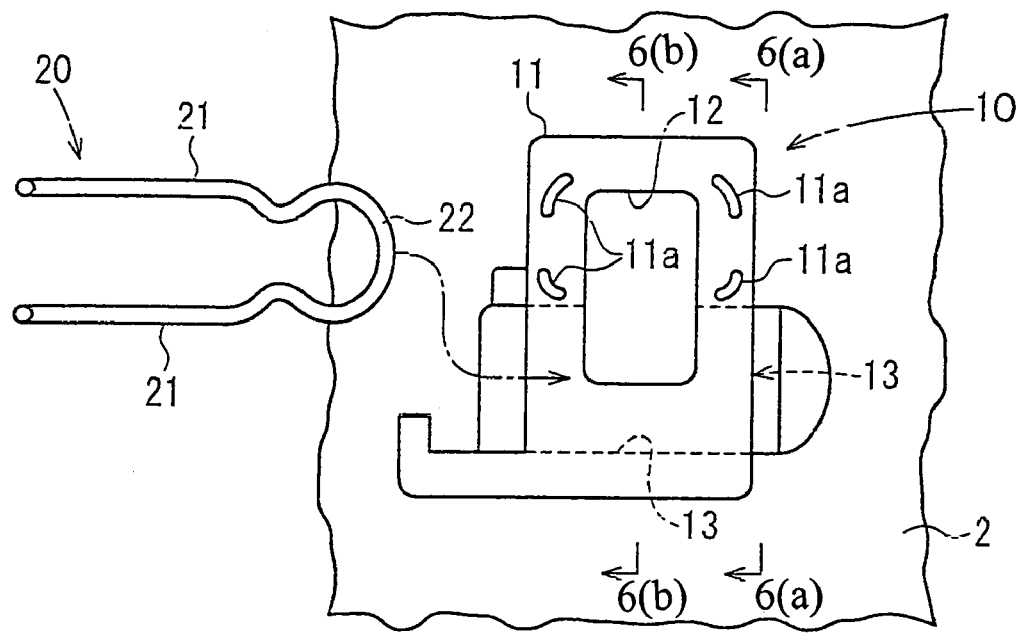
FIG. 5(a) is an exploded plan view of a mounting strip engaging portion and a mounting strip engaging spring.
Figure 5B:
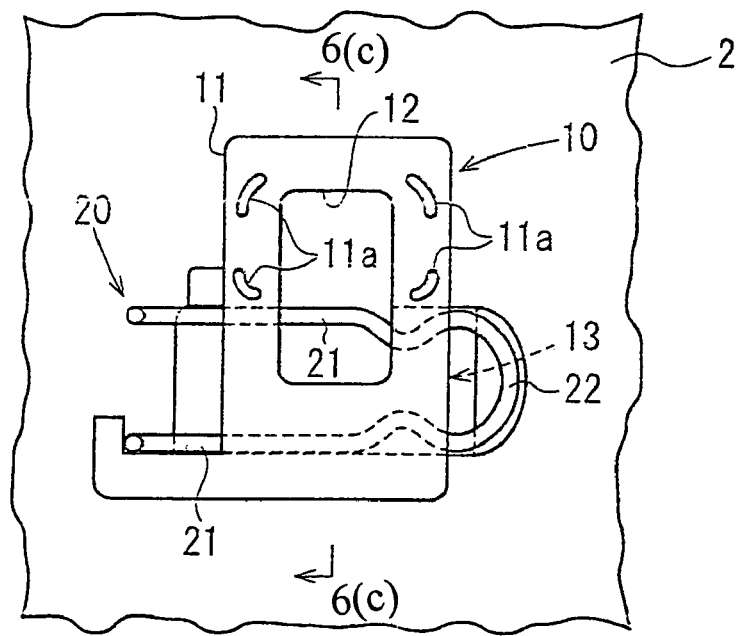
FIG. 5(b) is a plan view of the mounting strip engaging portion in a state in which the mounting strip engaging spring is attached.
Figure 6A:
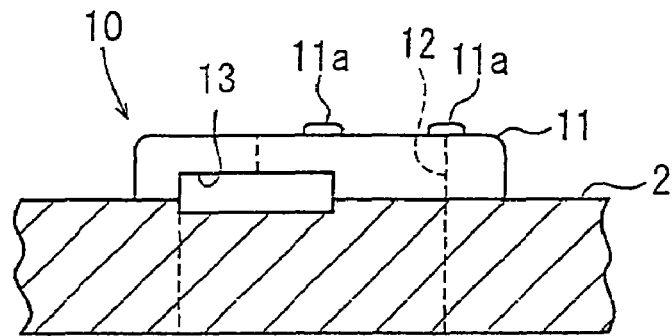
FIGS. 6(a), 6(b), 6(c) are cross-sectional views taken along the lines 6(a)-6(a), 6(b)-6(b), and 6(c)-6(c) in FIGS. 5(a) and 5(b).
Figure 6B:
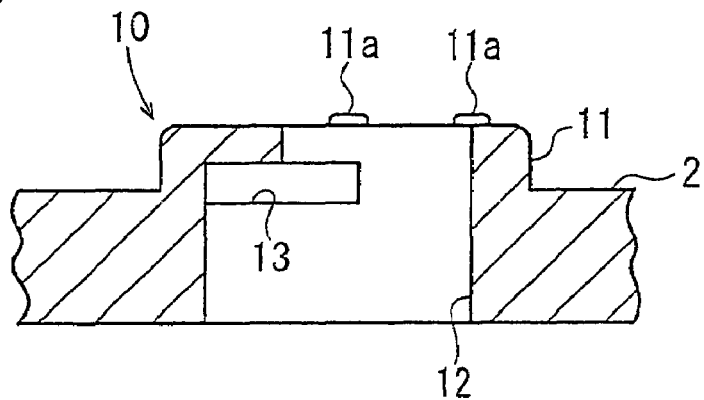
Figure 6C:
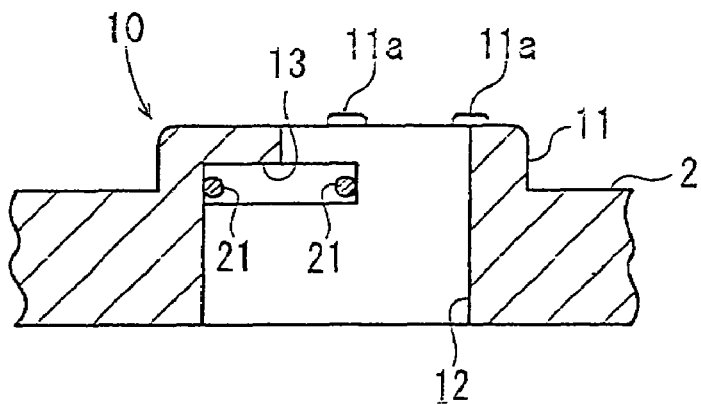
Figure 7:
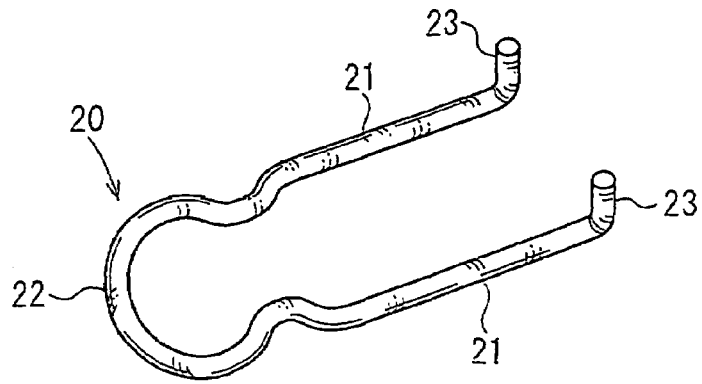
FIG. 7 is a perspective view of the mounting strip engaging spring.
Figure 8A:
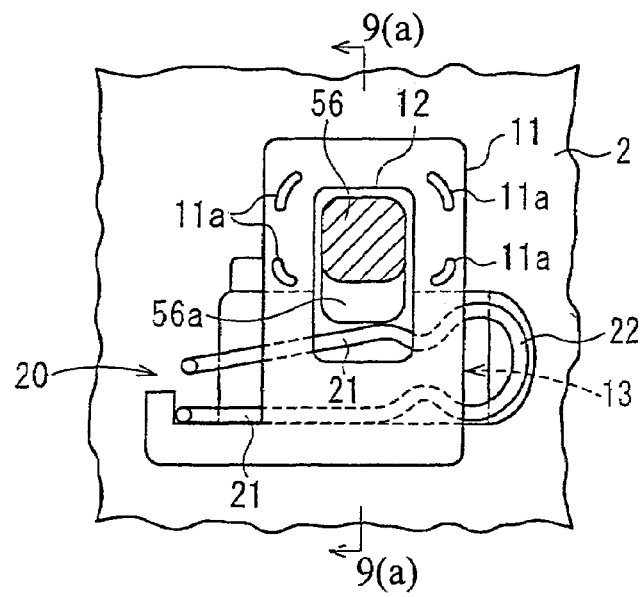
FIGS. 8(a) and 8(b) are cross-sectional views showing a state in which the mounting strip is in the course of being engaged with a mounting strip engaging portion, and in a state in which engagement is completed.
Figure 8B:
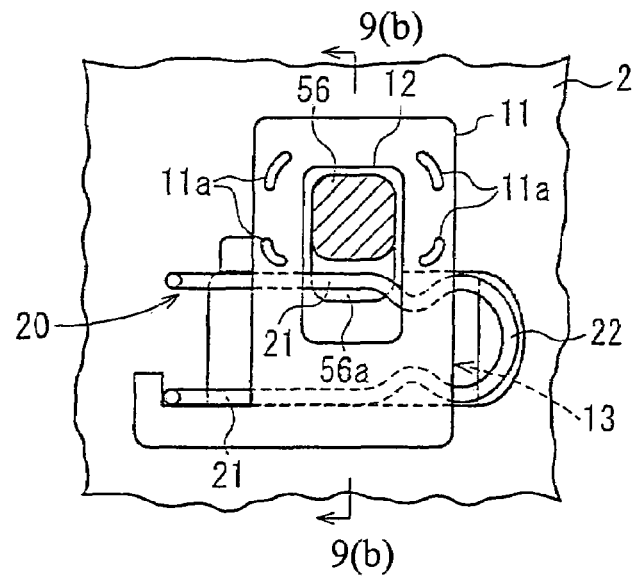
Figure 9A:
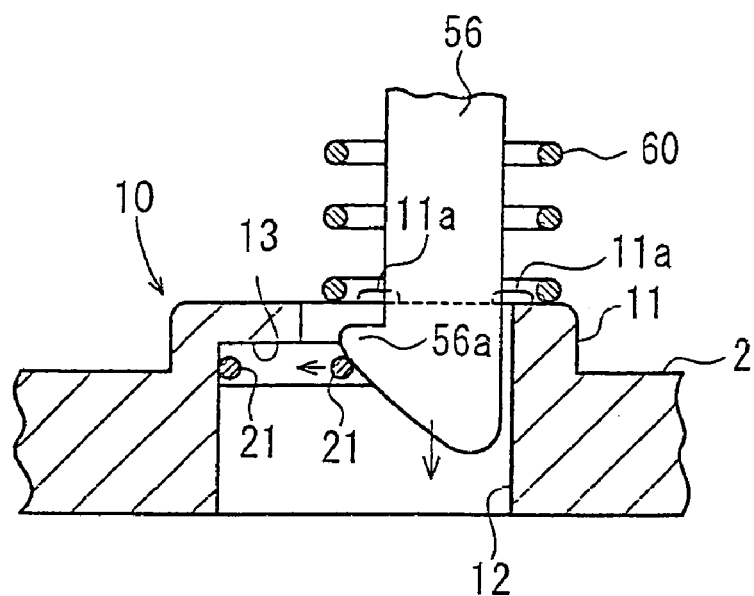
FIGS. 9(a) and 9(b) are cross-sectional views taken along the lines 9(a)-9(a) and 9(b)-9(b) in FIGS. 8(a) and 8(b).
Figure 9B:
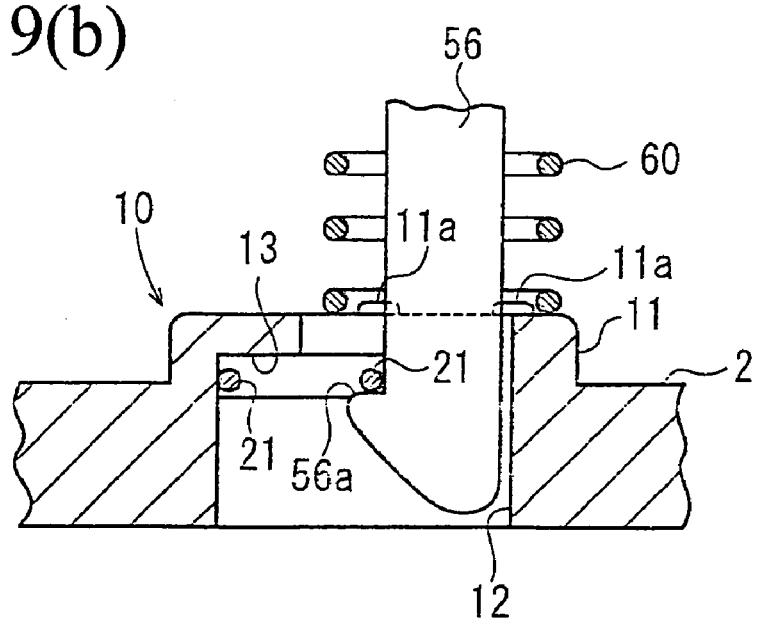

FIG. 1 is a cross-sectional view of a steering wheel with an airbag apparatus according to an embodiment (cross-sectional view taken along the line 1-1 in FIG. 2). FIG. 2 is a plan view of the steering wheel. FIG. 3 is a perspective view of the airbag apparatus viewed from the back side (the opposite side from the occupant side). FIG. 4 is an exploded perspective view of the steering wheel viewed from the back side. FIG. 5(a) is an exploded plan view of a mounting strip engaging portion and a mounting strip engaging spring, and FIG. 5(b) is a plan view of the mounting strip engaging portion in a state in which the mounting strip engaging spring is attached. FIGS. 6(a), 6(b) and 6(c) are cross-sectional views taken along the lines 6(a)-6(a), 6(b)-6(b) and 6(c)-6(c) of FIGS. 5(a) and 5(b), respectively. FIG. 7 is a perspective view of the mounting strip engaging spring. FIGS. 8(a) and 8(b) are cross-sectional views of the same portion as FIG. 6(c) showing a state in which a mounting strip is in the course of being engaged with the mounting strip engaging portion, and in a state in which engagement is completed, respectively. FIGS. 9(a) and 9(b) are cross-sectional views taken along the lines 9(a)-9(a) and 9(b)-9(b) in FIGS. 8(a) and 8(b), respectively.

In the description given below, the vertical direction and the lateral direction indicate the vertical direction and the lateral direction in a plane of the steering wheel when the steering wheel is viewed from an occupant side, in a state in which the steering wheel is at a position steered to advance the vehicle straight ahead. The fore-and-aft direction indicates a direction from the occupant side to the steering wheel side and vice versa. However, in FIGS. 1, 6(a)-6(c), and 9(a) and 9(b), the fore-and-aft direction is represented by the vertical direction in the drawing for the sake of convenience.

An airbag apparatus 50 is installed on the front side (occupant side) of a base member 2 at a center of a steering wheel 1 so as to be capable of being advanced and retracted in the direction of an axial line of a steering column (not shown). A coil spring 60 for urging the airbag apparatus 50 in the direction away from the base member 2 is interposed between the airbag apparatus 50 and the base member 2. The base member 2 is connected to a distal end of a steering shaft (not shown).

In this embodiment, spoke portions 3L, 3R and 3D extend from the base member 2 leftward, rightward and downward, and the distal end sides of the respective spoke portions 3L, 3R, 3D are connected to a ring portion 4 on the outer periphery of the steering wheel 1.

A mounting strip engaging portion 10 having a mounting strip insertion hole 12 is provided on the base member 2, and a mounting strip 56 provided on the airbag apparatus 50 is inserted into the mounting strip insertion hole 12, and is engaged by a mounting strip engaging spring 20.

The airbag apparatus 50 can be advanced and retracted in the direction of the axial line of the steering column, and a guide shaft 57 is projected on the airbag apparatus 50 in parallel with the axial line and a guide-shaft insertion hole 5 in which the guide shaft 57 is inserted is provided on the base member 2 for guiding the advancing and retracting movement.

Subsequently, the airbag apparatus 50 will be described.

The airbag apparatus 50 includes a retainer 51, a folded airbag 52, a mounting ring 53 for fixing the airbag 52 to the retainer 51, an inflator 54 for inflating the airbag 52, a module cover 55 of synthetic resin mounted to the retainer 51 so as to cover the folded body of the airbag 52, and so on. In this embodiment, the retainer 51 is also formed of synthetic resin.

The retainer 51 includes a main plate portion 51a arranged on the front side of the base member 2, and a surrounding wall portion 51b extending upright from the peripheral edge of the main plate portion 51a toward the front. The folded body of the airbag 52 is arranged inside the surrounding wall portion 51b.

In this embodiment, the main plate portion 51a is formed so that a center portion thereof protrudes forwardly of the peripheral portion thereof, and a back side of the protruded portion corresponds to a recess 51c for accommodating the inflator 54. The protruded portion (recess 51c) is provided with an opening 51d for inserting an inflator at a center thereof. The periphery of the opening 51d is provided with insertion holes (not shown) for stud bolts 53a of the mounting ring 53.

The mounting strip 56 for connecting the retainer 51 and the base member 2 and the guide shaft 57 for guiding movement of the retainer 51 with respect to the base member 2 in the direction toward and apart from the base member 2 are provided upright from the back surface of the main plate portion 51a rearward (the base member 2 side).

The mounting strip 56 and the guide shaft 57 are provided upright in parallel with the axial line of the steering column.

As shown in FIG. 3, in this embodiment, the mounting strip 56 is provided at three locations adjacent to left and right corners on an upper portion of the main plate portion 51a and near a laterally midsection of a lower portion of the main plate portion 51a, respectively. The guide shaft 57 is provided adjacent to vertical midsections of left and right side edges of the main plate portion 51a.

Claw portions 56a are provided so as to project from distal ends of the respective mounting strips 56 in the direction intersecting with the direction of advancement and retraction of the retainer 51 (direction of the normal line of the main plate portion 51a). In this embodiment, the claw portion 56a of the respective mounting strips 56 arranged on the upper portion of the main plate portion 51a projects downward, and the claw portion 56a of the mounting strip 56 arranged on the lower portion of the main plate portion 51a projects upward.

In this embodiment, as shown in FIG. 1 and FIG. 3, a coil spring 60 for urging the retainer 51 in the direction away from the base member 2 is provided so as to surround the respective mounting strips 56.

In this embodiment, the respective guide shafts 57 include legs (reference numbers are omitted) extending upright rearward from the back surface of the main plate portion 51a and columnar head portions (reference numbers are omitted) formed at the distal ends of the legs. The head portions are arranged with the direction of the axial lines thereof oriented in the direction of advancement and retraction of the retainer 51.

When mounting the airbag 52 and the inflator 54 to the retainer 51, the peripheral edge of an inflator inserting port (reference number is omitted) of the airbag 52 at the proximal side thereof is overlapped with the peripheral edge of the inflator opening 51d from the front and is depressed with the mounting ring 53. In this case, the stud bolts 53a of the mounting ring 53 are inserted into the bolt insertion holes (not shown) provided on the peripheral edge of the inflator insertion port and the bolt insertion holes of the retainer 51. The distal end of the inflator 54 is inserted into the opening 51d from the rear and a flange 54a of the inflator 54 is overlapped with the peripheral edge of the opening 51d. In this case, the stud bolts 53a are inserted also into the bolt insertion holes (not shown) provided on the flange 54a. Then, nuts 54b are tightened onto the stud bolts 53a, and the airbag 52, the mounting ring 53 and the inflator 54 are fixed to the retainer 51.

A module cover 55 includes a main plate portion 55a for covering the front side of the retainer 51 and a leg-shaped strip 55b extending upright from the back surface of the main plate portion 55a rearward. The leg-shaped strip 55b is arranged along the inner peripheral surface of the surrounding wall portion 51b, and is secured to the surrounding wall portion 51b by the fixture such as a rivet or the like (not shown). The main plate portion 55a is configured so as to be torn and start to open by a pressing force from the airbag 52 when the airbag 52 is inflated.

In this embodiment, a contact plate 70 formed of metal, which forms a horn switch mechanism, is mounted to the back surface of the main plate portion 51a of the retainer 51. As shown in FIG. 3, the contact plate 70 is provided continuously from the left edge portion along the lower edge portion to the right edge portion of the main plate portion 51a. In this embodiment, a contact holding strip 51e is provided on the surrounding wall portion 51b on the lower side of the retainer 51 so as to project downward to oppose the front surface of the lower spoke portion 3D of the steering wheel 1, and an extending strip 70a overlapped with the contact holding strip 51e is provided so as to extend from the portion near a midsection of the contact plate 70 in the extending direction thereof.

Contact points 71 of the horn switch mechanism on one side are provided at positions near both ends of the contact plate 70 and on the extending strip 70a.

Subsequently, a mounting structure of the airbag apparatus 50 to the steering wheel 1 will be described in detail.

As shown in FIG. 2, the mounting strip engaging portions 10 are provided on the base member 2 of the steering wheel 1 at positions opposed to the respective mounting strips 56. The mounting strip engaging portions 10 each are provided with the mounting strip engaging spring 20 for engaging the mounting strip 56 to the mounting strip engaging portion 10. The base member 2 is provided with the guide shaft insertion holes 5 at positions opposing to the respective guide shafts 57.

The base member 2 is provided with contact holding bosses 6 at positions opposing to the respective contact points 71 on both left and right ends of the contact plate 70 so as to extend upright, and contact points 72 of the horn switch mechanism on the other side are provided at distal ends of the respective bosses 6. A contact installing section 7 is provided on the front surface of the lower spoke portion 3D that opposes the contact holding strip 51e, and the contact point 72 is formed on the contact installing section 7 so as to oppose to the contact point 71 of the contact holding strip 51e.

In this embodiment, as shown in FIG. 7, the engaging spring 20 is substantially U-shaped and includes a pair of parallel extending portions 21, a connecting portion 22 that connects the parallel extending portions 21 to each other at one end, and gripper margins 23 bent forward from the other ends of the parallel extending portions 21, and the parallel extending portions 21 are resiliently deformed in the direction toward/away from each other.

As shown in FIGS. 5(a) and 5(b) and FIGS. 6(a)-6(c), in this embodiment, a projecting shoulder 11 projecting forward from the front surface of the base member 2 is formed on each mounting strip engaging portion 10, and a mounting strip insertion hole 12 is formed so as to penetrate from the front surface of the projecting shoulder 11 to the back surface of the base member 2. The projecting shoulder 11 is also formed with an engaging spring insertion hole 13 at a midsection in the direction of the thickness thereof (in the direction of projection from the front surface of the base member 2) so as to penetrate through the projecting shoulder 11 in the direction intersecting with the extending direction of the mounting strip insertion hole 12 (lateral direction in this embodiment).

As shown in the drawing, the engaging spring insertion hole 13 is formed in such positional relation that the engaging spring insertion hole 13 is partly overlapped with the mounting strip insertion hole 12 in a plane along the front surface of the base member 2. The respective mounting strip engaging portions 10 on the upper left and upper right of the base member 2 are formed in such positional relation that the upper half of the midsection of the engaging spring insertion hole 13 is overlapped with the lower half of the mounting strip insertion hole 12. The lower mounting strip engaging portion 10 is formed in such positional relation that the lower half of the midsection of the engaging spring insertion hole 13 is overlapped with the upper half of the mounting strip insertion hole 12.

The engaging spring 20 is inserted into the engaging spring insertion hole 13 as shown in FIG. 5(a) to FIG. 5(b). In this case, the respective parallel extending portions 21 are inserted into the engaging spring insertion hole 13 in such posture that the respective parallel extending portions 21 extend in the lateral direction, and the connecting portion 22 and the other ends of the parallel extending portions 21 extend out from the engaging spring insertion hole 13 and are overlapped with the front surface of the base member 2. Then, as shown in FIG. 5(b), the midsection of one of the parallel extending portion 21 is arranged in the mounting strip insertion hole 12 through an area in which the engaging spring insertion hole 13 and the mounting strip insertion hole 12 are overlapped with each other.

The portion of the engaging spring insertion hole 13 adjacent to the opening at both ends is provided with recesses, ribs, projections, and so on (reference numbers of these members are omitted) that engage with the connecting portion 22 extending from the insertion hole 13 and the other ends of the respective parallel extending portions 21, and the engaging spring 20 inserted into the insertion hole 13 is retained thereby. However, these members do not impair displacement of the parallel extending portions 21 in the direction toward/away from each other.

In this embodiment, a one-touch mounting mechanism (snap-lock mechanism) of the mounting strip 56 is constructed by the mounting strip engaging portion 10 (mounting strip insertion hole 12) and the engaging spring 20.

When the airbag apparatus 50 is mounted to the steering wheel 1, the respective mounting strips 56 with the coil springs 60 fitted thereon are inserted into the corresponding mounting strip insertion holes 12, and the entire airbag apparatus 50 is pressed toward the steering wheel 1. In this case, the respective guide shafts 57 are also inserted into the corresponding guide shaft insertion holes 5.

In this arrangement, as shown in FIG. 8(a) to FIG. 8(b) and FIG. 9(a) to FIG. 9(b), each mounting strip 56 enters into the engaging spring insertion hole 12 so as to push one of the parallel extending portions 21 of the engaging spring 20, which extend across the mounting strip insertion hole 12, toward the other parallel extending portion 21 with the claw portion 56a. When the claw portion 56a enters into the inner side of the one parallel extending portion 21, the parallel extending portion 21 is restored to the original position by its restoring force and engages the claw portion 56a, so that the mounting strip 56 cannot come off the engaging spring insertion hole 12. Accordingly, the airbag apparatus 50 and the steering wheel 1 are connected via the mounting strip 56.

When engagement of the mounting strips 56 to the mounting strip engaging portions 10 is completed, the coil springs 60 are interposed between the front surface of the projecting shoulder 11 and the back surface of the retainer 51 (main plate portion 51a) in a pressure-accumulated state. Reference numeral 11a designates projections for positioning of the coil springs 60 with respect to the front surface of the projecting shoulder 11.

In this embodiment, as shown in FIG. 9(b), it is configured in such a manner that the distal end of the mounting strip 56 which is completely engaged does not project from the mounting strip insertion hole 12 rearwardly with respect to the back surface of the base member 2.

In the steering wheel 1 with the airbag apparatus 50, when the module cover 55 is pressed, the entire airbag apparatus 50 moves toward the steering wheel 1, and then the contact points 71, 72 come into contact with each other to sound the horn.

In the steering wheel 1 with the airbag apparatus 50, since the mounting strip 56 projecting upright from the back surface of the retainer 51 is mounted to the steering wheel 1 by the one-touch mounting mechanism formed of the mounting strip engaging portion 10 and the engaging spring 20, an additional member for connecting the airbag apparatus 50 and the steering wheel 1 is not necessary. Therefore, the structure is simplified and the entire weight can be reduced, and also reduction of the cost such as the member cost can be achieved.

Figure 10:
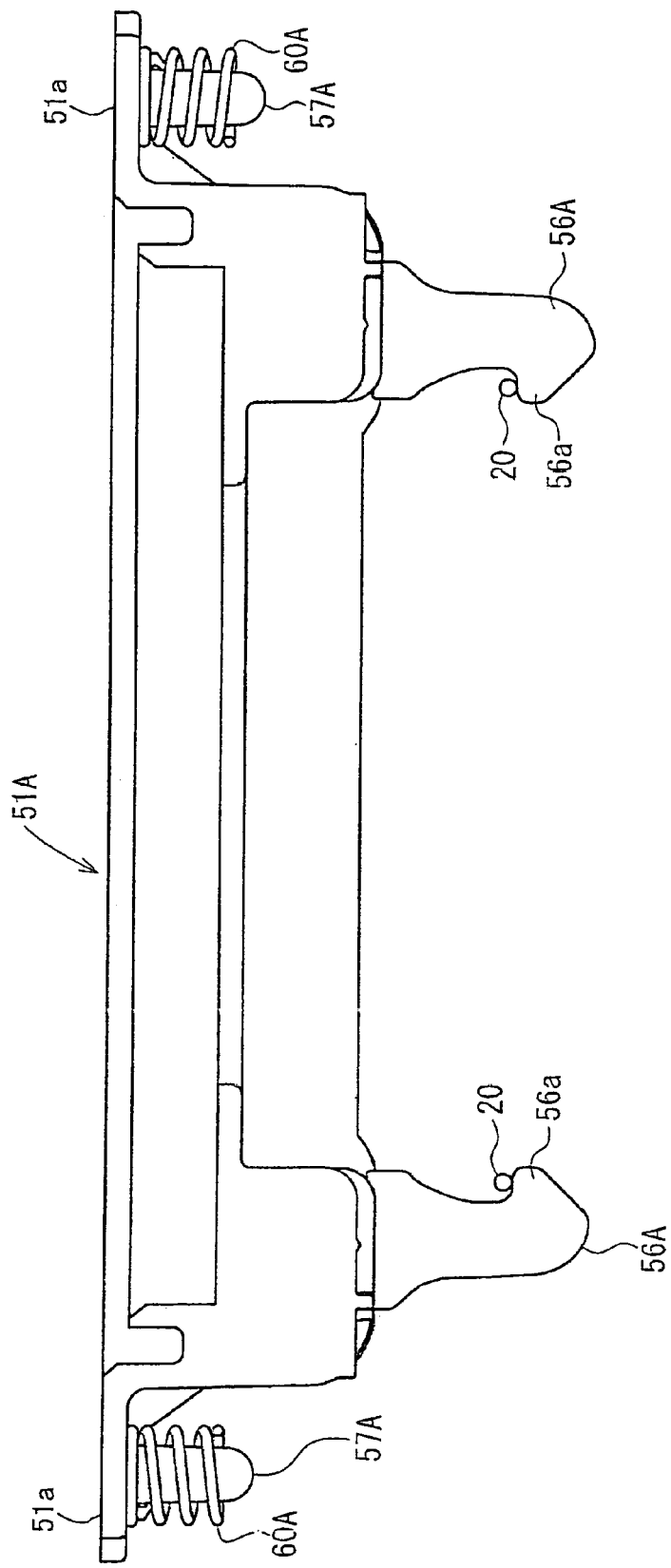
FIG. 10 is a side view of a retainer according to another embodiment of the invention.

In the embodiment shown above, the coil springs 60 are fitted on the mounting strips 56. However, as in the case of a retainer 51A according to another embodiment shown in FIG. 10, the coil spring 60 may be adapted to mount on a guide shaft 57A. FIG. 10 is a side view of the retainer 51A.

The retainer 51A includes the protrusion 51a projecting sideways from the upper portion (occupant side) of the side surface of the retainer 51A. Mounting strips 56A are provided upright on the protrusion 51a in parallel with the axial line of the steering column and in the opposite direction from the occupant. The claws 56a are formed so as to project from the respective distal ends in the upright direction of the mounting strips 56A toward substantially the center of the retainer 51A, and the claws 56a are engaged with the mounting strip engaging springs 20.

Figure 11A:
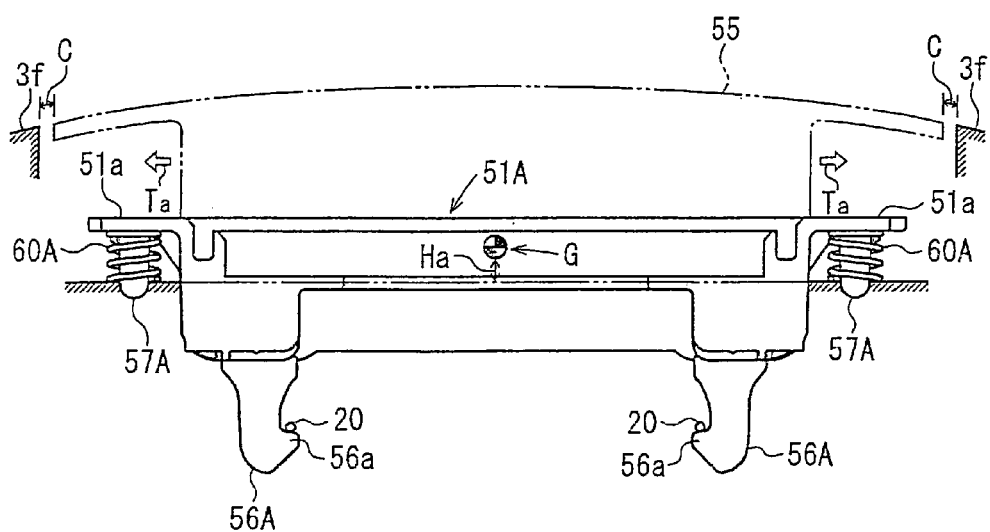
FIGS. 11(a) and 11(b) are side views of the retainer according to one embodiment and a comparative example.

Since the retainer 51A depicted in FIG. 10 has the protrusion 51a provided on an upper portion (occupant side) of a side surface of the retainer 51A, a clearance C between the module cover 55 and a spoke front portion 3f (see FIG. 11(a)) adjacent thereto can be reduced.

Figure 11B:
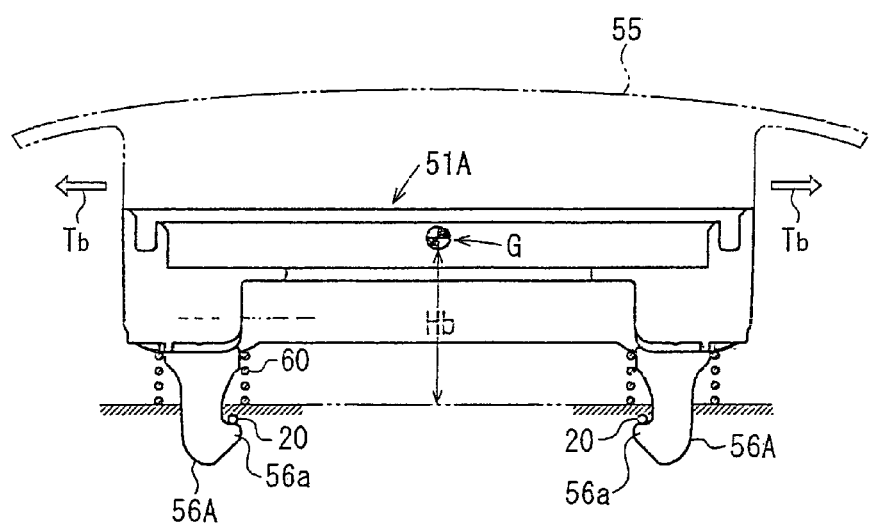
Figure 12A:
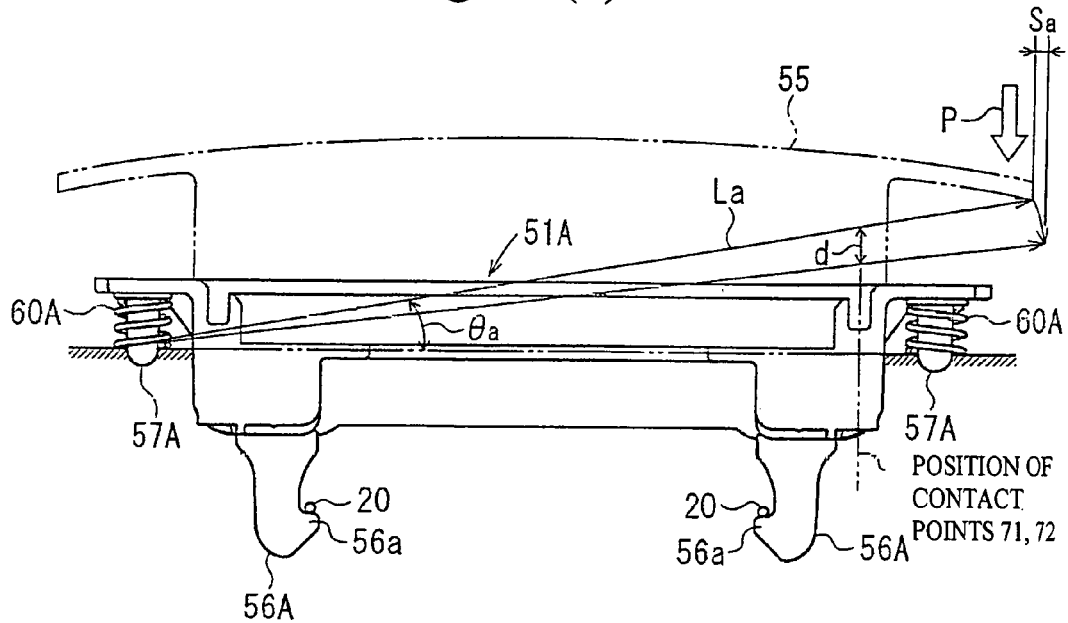
FIGS. 12(a) and 12(b) are side views of the retainer according to another embodiment and a comparative example.
Figure 12B:
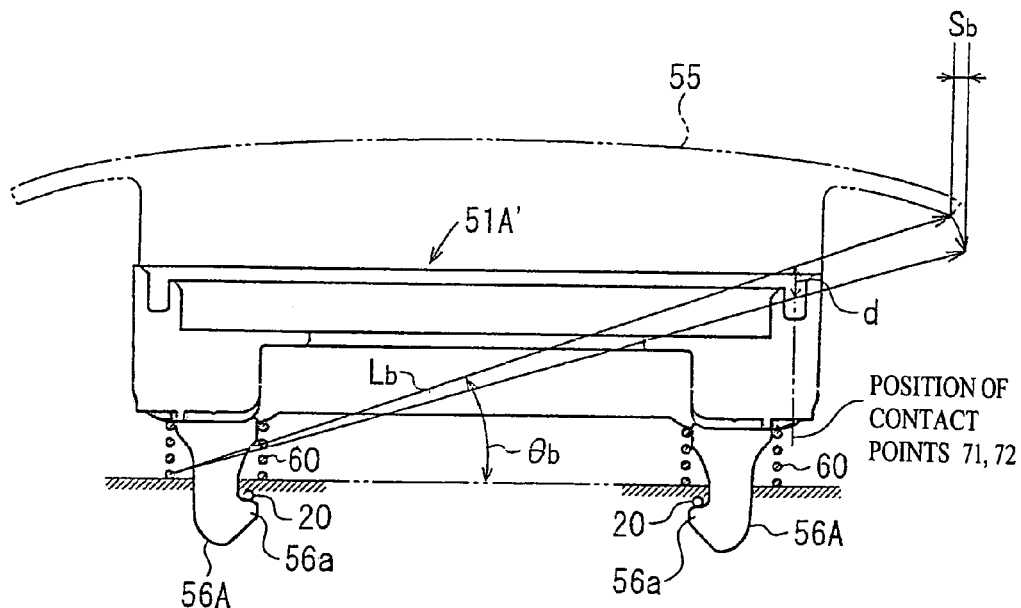

The reason will be described referring to FIGS. 11(a) and 11(b) and 12(a) and 12(b). In FIGS. 11(a) and 11(b) and 12(a) and 12(b), the drawing FIGS. 11(a) and 12(a) are explanatory drawings showing a positional relation between the retainer 51A and the steering wheel, and the structure of the retainer 51A itself is the same as that depicted in FIG. 10. The drawing FIGS. 11(b) and 12(b) are explanatory drawings showing a positional relation between a retainer 51A' and the steering wheel according to a comparative example in which the protrusion 51a is eliminated from the retainer 51A depicted in the drawing FIGS. 11(a) and 12(a) and the coil springs 60 are fitted on the mounting strips 56A instead.

In FIG. 11(a), since the protrusion 51a is arranged on the upper portion of the side surface of the retainer 51A, a height Ha from a lower end of a coil spring 60A to a center of gravity G of the airbag apparatus is small. In contrast, in FIG. 11(b), a height Hb from a lower end of the coil spring 60 to the center of gravity G is significantly larger than Ha.

Therefore, assuming that the spring constants are equal, the amount of lateral movement Ta in the drawing FIG. 11(a) when the airbag apparatus moves laterally due to vibrations of the vehicle body is smaller than the amount of lateral movement Tb in the drawing FIG. 11(b).

Consequently, in the case of the drawing FIG. 11(a), even when a clearance C between the spoke front surface portion 3f and the module cover 55 is reduced, the module cover 55 does not hit against the front surface portion 3f. In contrast, in the case of the drawing FIG. 11(b), the airbag apparatus hits against the spoke front surface portion 3f at the time of lateral movement, which generates abnormal noise or impact, unless the clearance (not shown in the drawing FIG. 11(b)) is set to a distance larger than that in the drawing FIG. 11(a).

As shown in FIGS. 12(a) and (b), in a case in which an end of the module cover 55 is pressed as indicated by an arrow P to bring the contact points 71, 72 of the horn switch 70 into contact with each other, the airbag apparatus rotates about the coil spring 60A or 60 on the opposite side (left side of the respective drawings) from the arrow P.

In the retainer 51A in the drawing FIG. 12(a), inclination of a line segment La connecting the coil spring 60A on the left side and a right end of the module cover 55 (inclination with respect to a plane perpendicular to the axial line of the steering column) θs is small. Therefore, when the module cover 55 is pressed downward in the direction indicated by the arrow P by a stroke amount d so as to bring the contact points 71, 72 into contact with each other, a shift amount Sa of the module cover 55 to the right side of the right end thereof is small.

In contrast, in the drawing FIG. 12(b), inclination θb of a line segment Lb connecting a lower end of the left coil spring 60 and the right end of the module cover 55 is large. Therefore, a shift amount Sb toward the right when the module cover 55 is pressed downward by the stroke amount d is larger than Sa shown above.

Consequently, in FIG. 12(a), the clearance C (see FIG. 11(a)) between the module cover 55 and the spoke front surface portion 3f adjacent thereto can be set to a small value. In FIG. 12(b), the module cover 55 hits against the spoke front surface portion 3f when the module cover 55 is pressed, and hence an unusual feeling will be generated unless the clearance C is increased.

From the reason described above, in the retainer 51A in the embodiment shown in FIG. 10, the clearance C can be reduced. By reducing the clearance C, the appearance of the steering wheel is significantly improved.

Figure 13:
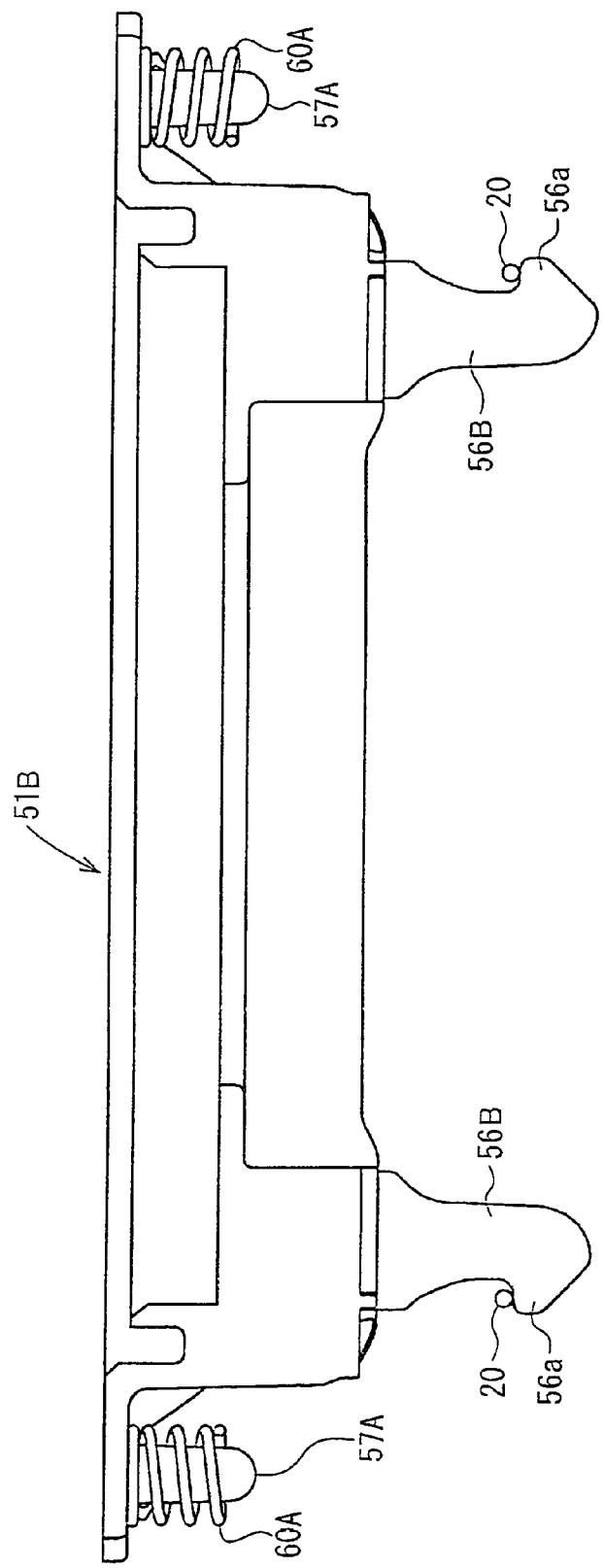
FIG. 13 is a side view of the retainer according to still another embodiment of the invention.

In the retainer 51A shown in FIG. 10, the claw portions 56a are provided so as to project toward the substantially center of the retainer 51A. However, it is also possible to provide the claw portions 56a so as to project outwardly of a retainer 51B (for example, the substantially radial direction from the axial center of the steering column or the direction obliquely intersecting thereto) from the respective mounting strips 56B as in the case of the retainer 51B shown in FIG. 13.

Figure 14:
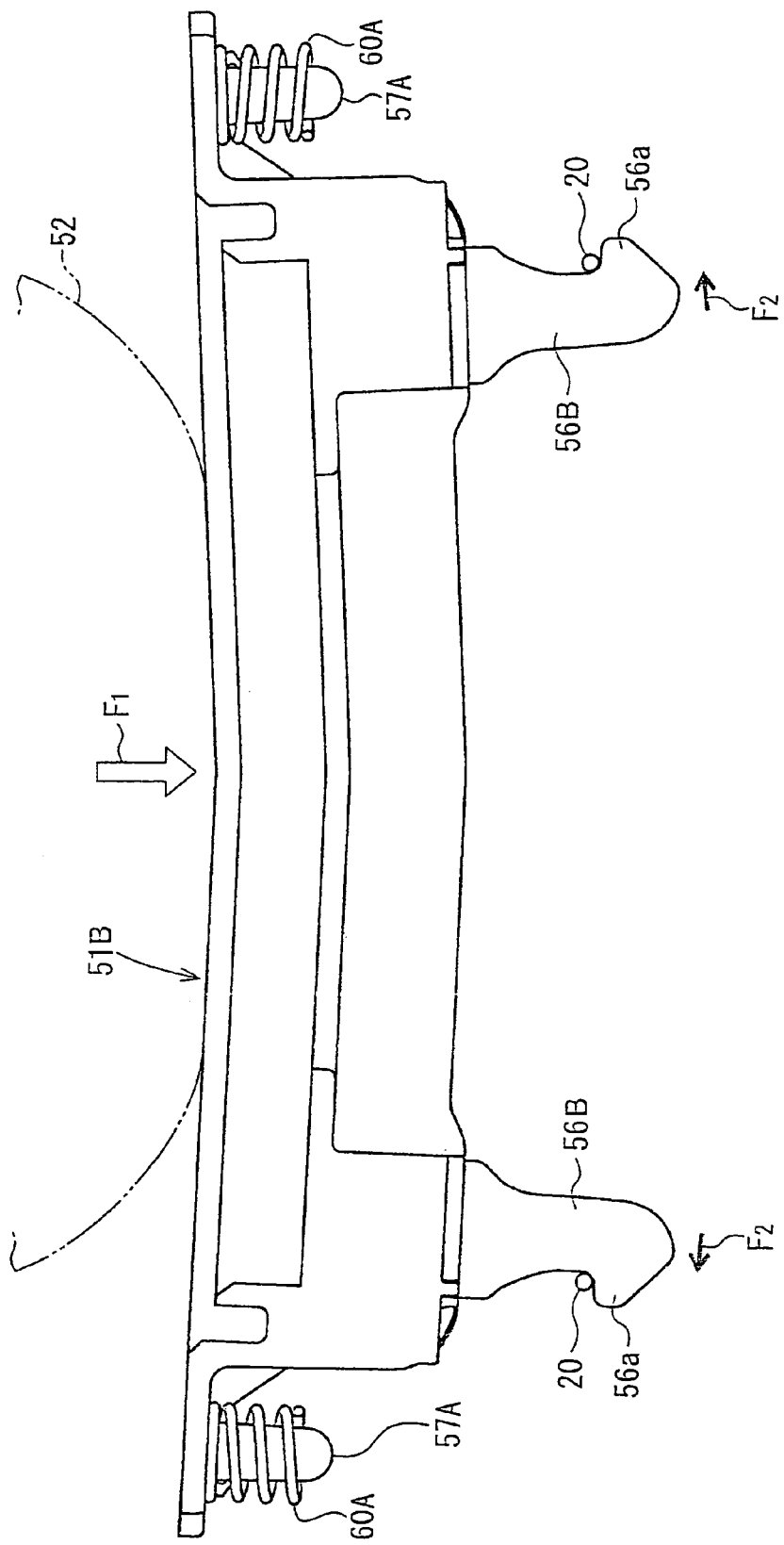
FIG. 14 is a side view showing the retainer in FIG. 13 in a deformed state.

In this manner, in the case in which the claw portion 56a is provided outward, when the retainer 51B is warped into a depressed shape in association with the operation of the airbag as shown in FIG. 14, the claw portions 56a engage with the engaging springs 20 more deeply.

In other words, when the airbag 52 mounted on the upper surface side of the retainer 51B is inflated in association with the operation of the inflator 54, the airbag 52 presses the portion near the center of the retainer 51B downward as indicated by an arrow $F_1$, and the retainer 51B is slightly warped into a depressed shape. When the retainer 51B is warped in the depressed shape, the respective mounting strips 56B are displaced outward on the side of the distal ends thereof in the direction indicated by an arrow $F_2$, and the claw portions 56a engage with the-engaging springs 20 more deeply.

Therefore, even when the retainer 51B is formed of a material which is relatively low in rigidity, such as synthetic resin, and hence the extent of warp in the depressed shape at the time of inflation of the airbag is increased, the mounting strips 56B and the engaging springs 20 can be kept engaged.

Figure 15:
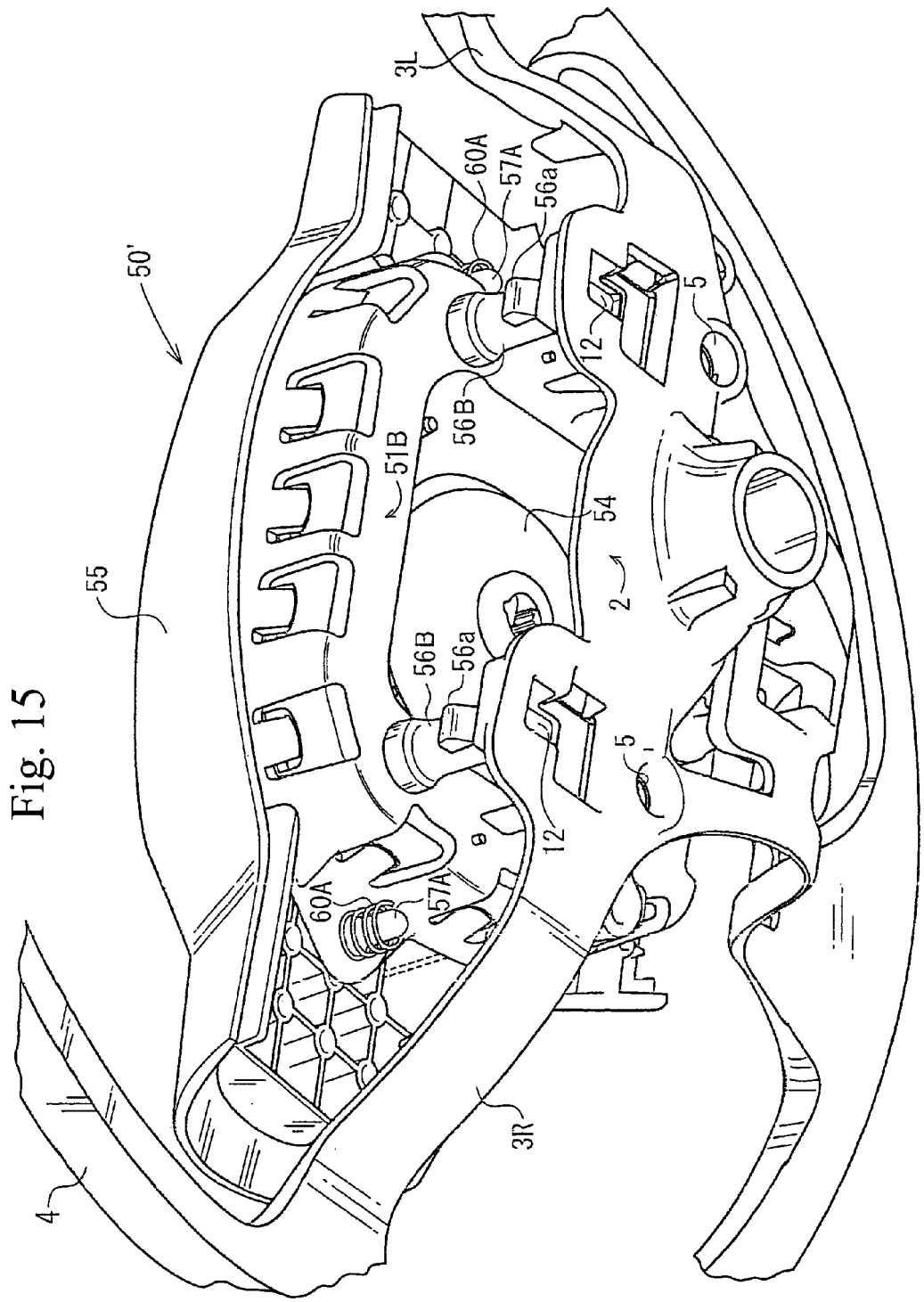
FIG. 15 is a perspective view showing an engaging relation between the airbag apparatus having the retainer in FIG. 13 and the steering wheel.

FIG. 15 is an exploded perspective view of the steering wheel provided with an airbag apparatus 50B having the retainer 51B viewed from below. In FIG. 15, the common members as in the embodiment described above are represented by the same reference numbers.

Figure 16:
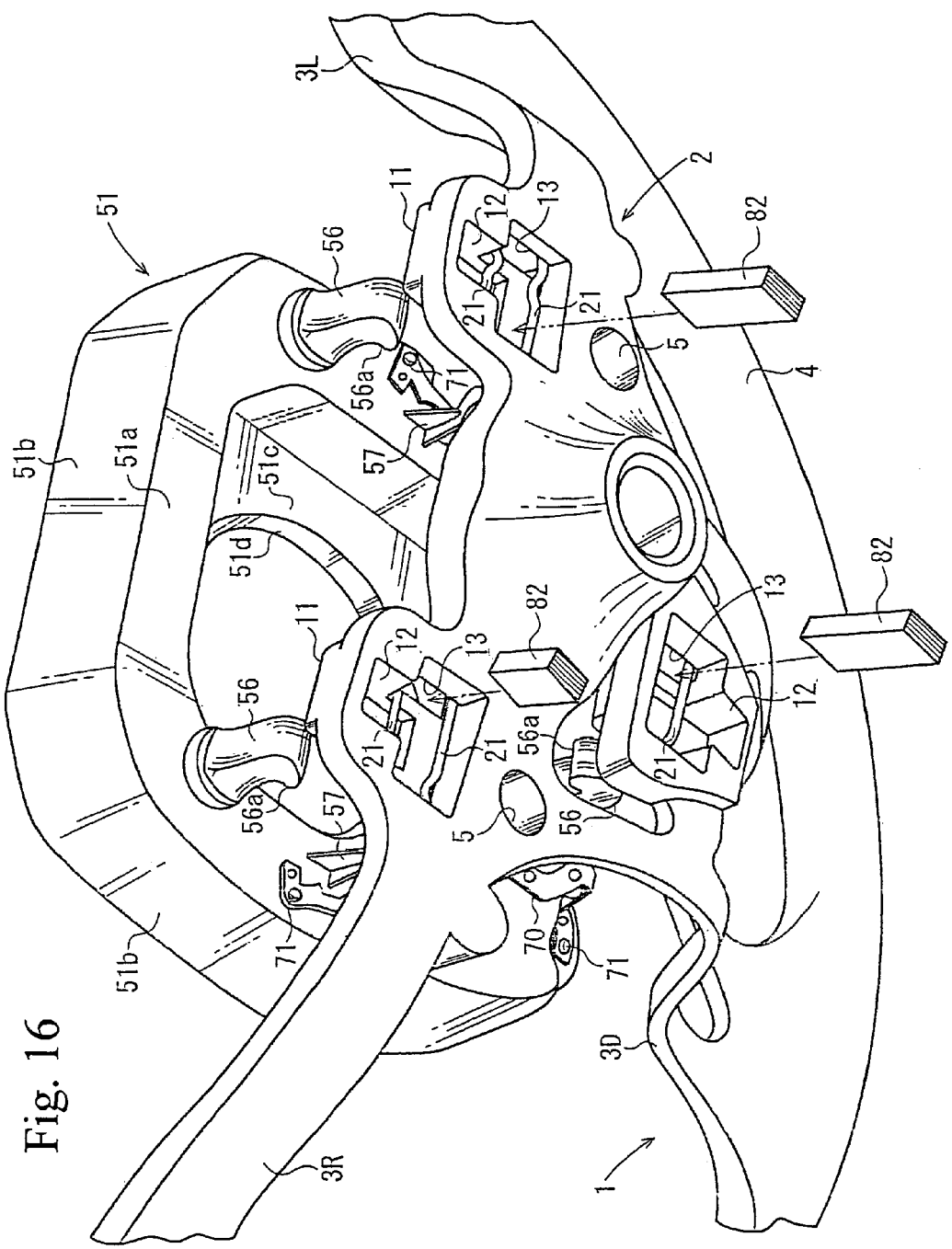
FIG. 16 is a perspective view of the steering wheel viewed from the back side according to another embodiment.
Figure 17:
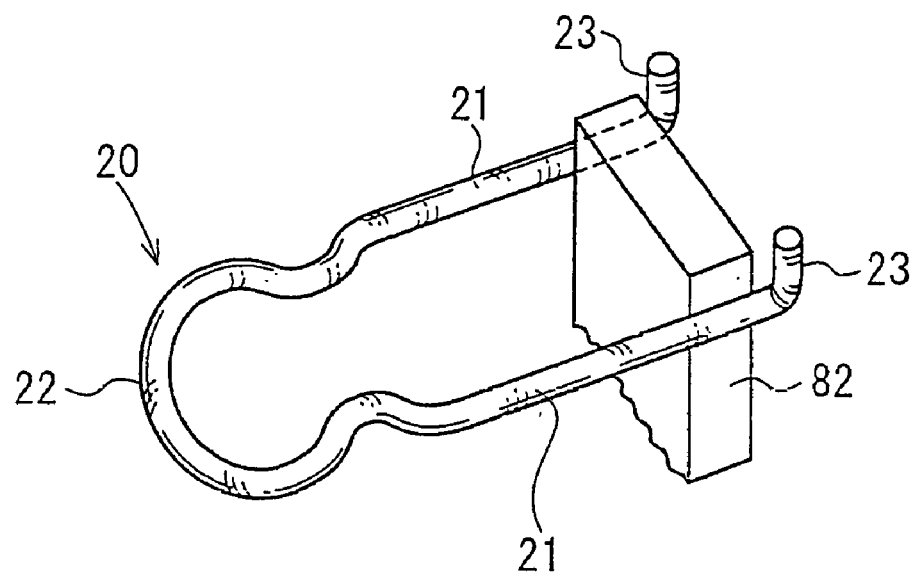
FIG. 17 is a perspective view of an engaging spring and a spacer according to still another embodiment of the invention.

Referring now to FIGS. 16 and 17, an embodiment in which engagement of the mounting strip 56 is strengthened will be described: FIG. 16 is a perspective view of the portion similar to that in FIG. 4, and FIG. 17 is a perspective view showing a relation between a spacer 82 and the engaging spring 20.

The spacer 82 is inserted between the parallel extending portions 21 of the engaging spring 20 with which the mounting strip 56 is engaged so as to prevent approach of the parallel extending portions 21 to each other. The spacer 82 is preferably formed integrally with a steering body cover which is mounted to the rear side of the steering wheel.

By the provision of the spacer 82, the parallel extending portions 21 do not approach with respect to each other, and the mounting strip 56 is kept engaged with the engaging strip 20. Therefore, a spring having a small spring constant can be employed as the engaging spring 20. By using the engaging spring 20 having the small spring constant, a force required for assembling the mounting strip 56 to the engaging spring 20 is small, and workability in assembly of the airbag apparatus is improved.

Other structures in FIG. 16 are the same as those in FIG. 4, and the same reference numbers represent the same parts.

Figure 18:
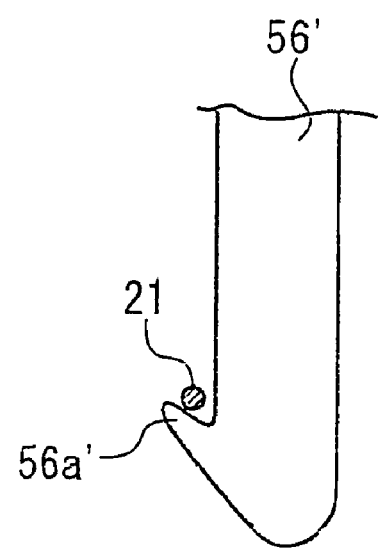
FIG. 18 is a side view of the mounting strip according to still another embodiment of the invention.

FIG. 18 shows another embodiment. In this embodiment, a claw portion 56a' at a distal end of a mounting strip 56' is formed with a backward-facing point, so that the claw portion 56a' is deeply engaged with the engaging spring 20.

In this embodiment as well, the parallel extending portions 21 are prevented from approaching to each other, and the mounting strip 56' is retained by the engaging spring 20.

Figure 19:
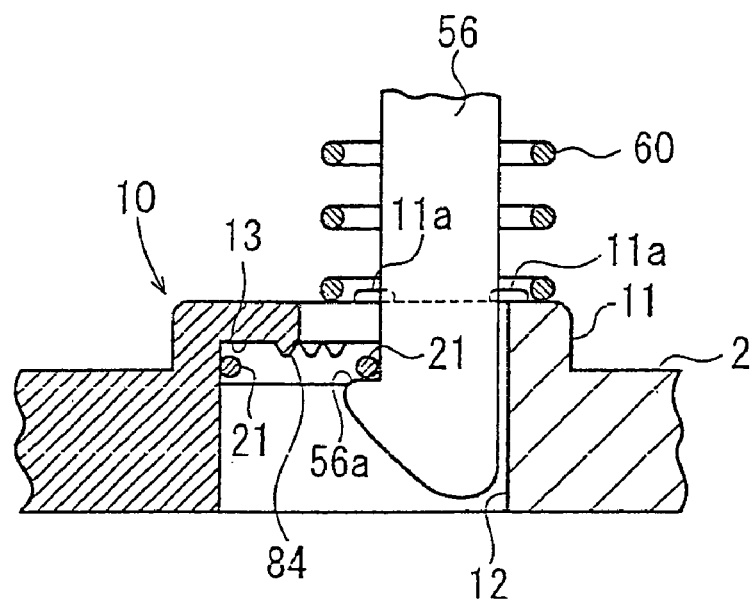
FIG. 19 is a cross-sectional view of a portion near a mounting strip insertion hole according to still another embodiment of the invention.

FIG. 19 shows a wave-shaped projecting ridge portion 84 having a sawtooth cross-section on the lower surface of the engaging spring insertion hole 13 in FIG. 9(b). The projecting ridge portion 84 extends in parallel with the parallel extending portion 21.

In this embodiment as well, movement of the parallel extending portions 21 in the directions approaching to each other is prevented by the projecting ridge portion 84.

Figure 20:
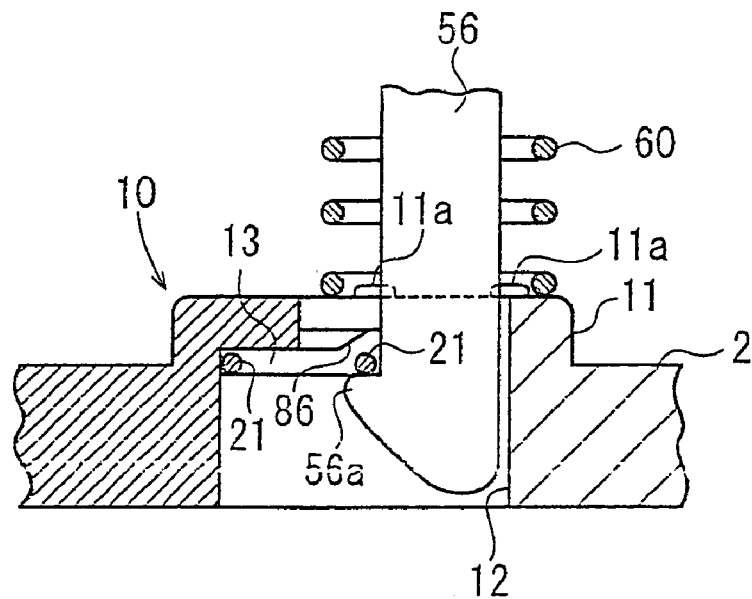
FIG. 20 is a cross-sectional view of a portion near the mounting strip insertion hole according to still another embodiment of the invention.

In FIG. 20, an inclined surface 86 is provided so as to oppose to the parallel extending portion 21 instead of the projecting ridge portion 84. The inclined surface 86 is provided at an end of the engaging spring insertion hole 13 on the side of the mounting strip 56 so as to be faced downward in the drawing.

The inclined surface 86 prevents movement of the parallel extending portions 21 in the directions approaching to each other.

In the embodiment shown in FIG. 18 to FIG. 20, the spring constant of the engaging spring 20 can be reduced to improve workability of assembly of the airbag apparatus.

Figure 21A:
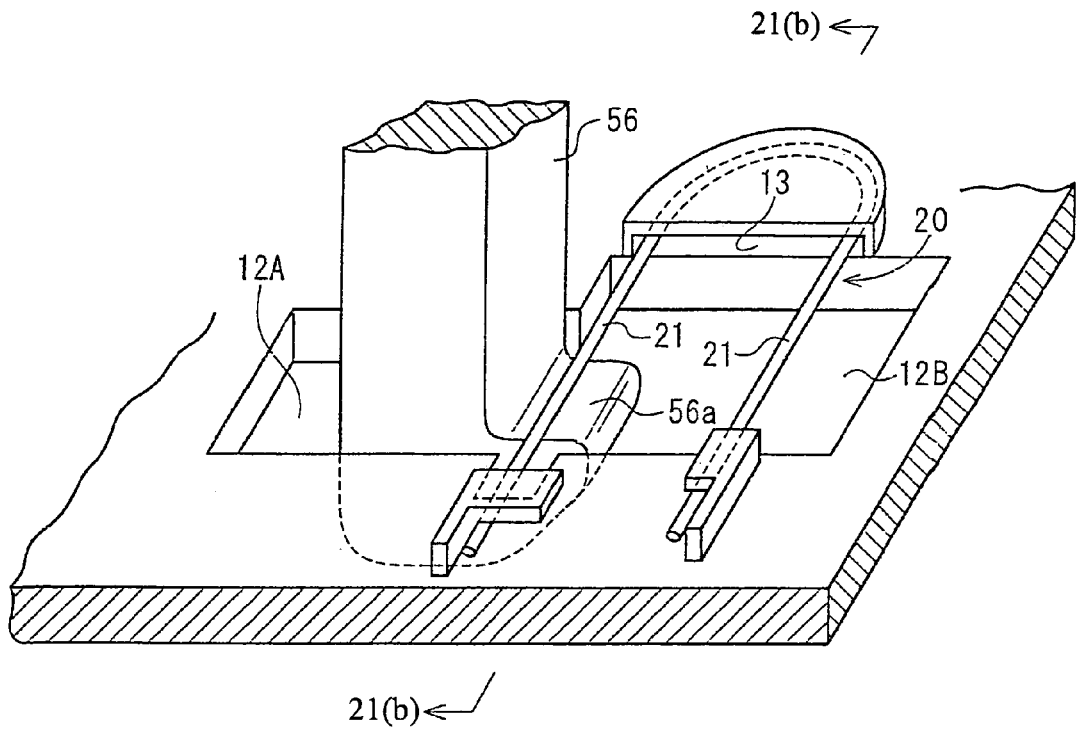
FIGS. 21(a) and 21(b) are schematic drawings showing a portion near the mounting strip insertion hole according to another embodiment of the invention.
Figure 21B:
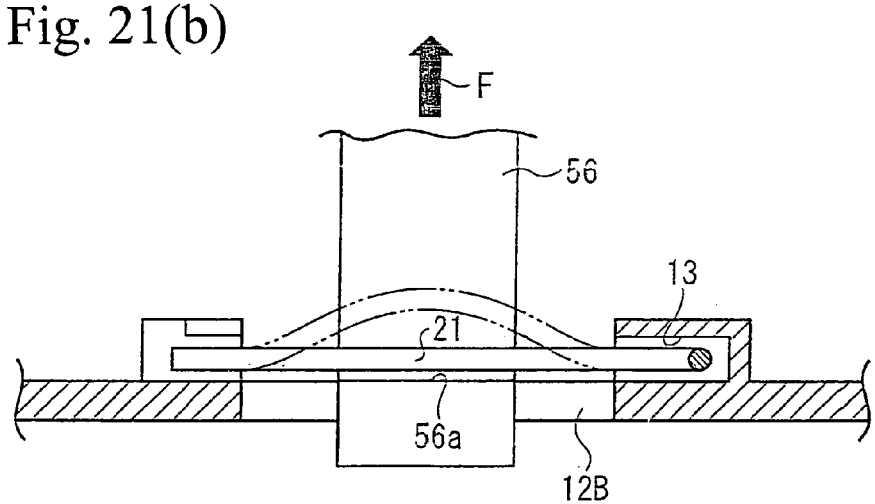

FIG. 21(a) is a perspective view of a portion near the mounting strip insertion hole in the embodiment having a structure in which a tensile stress applied to the mounting strip 56 when the airbag is inflated is reduced, and FIG. 21(b) is a cross-sectional view taken along the line 21(b)-21(b) in FIG. 21(a).

In this embodiment, the mounting strip insertion hole includes a narrow portion 12A having a relatively small width and a wide portion 12B having a relatively large width. The mounting strip 56 is inserted into the narrow portion 12A and the claw portion 56a is exposed to the wide portion 12B. The respective parallel extending portions 21 of the engagement spring 20 extend across the wide portion 12B.

When the airbag is inflated, a force F is applied to the mounting strip 56 upwardly in the drawing by being pulled by the airbag. In this embodiment, since the parallel extending portion 21 extends across the wide portion 12B, as shown in FIG. 21(b), the parallel extending portion 21 is pulled by the mounting strip 56 and significantly deformed. Therefore, the maximum tensile stress generated at the mounting strip 56 is alleviated. Accordingly, the strength required for the constituting members of the mounting strip 56 may be alleviated, and the thickness of the mounting strip 56 may be reduced.

The above-described embodiments are simply shown by way of example, and the present invention is not limited to the embodiments shown in the drawings.

For example, in the above-described embodiment, the one-touch mounting mechanism of the mounting strips 56, 56A, 56B is of a system in which mounting is achieved by the engagement between the claw portion 56a of the mounting strips 56, 56A, 56B and the engaging spring 20. However, a one-touch mounting mechanism other than this type may be employed.

The disclosures of Japanese Patent Application Nos. 2005-75355 filed on Mar. 16, 2005; 2005-213018 filed on Jul. 22, 2005; and 2005-327698 filed on Nov. 11, 2005, are incorporated herein.

What is claimed is:

1. A steering wheel device with an airbag comprising:
a steering wheel having a base with a mounting strip insertion hole, and
an airbag apparatus mounted to the base of the steering wheel to advance and retract in a direction of an axial line of a steering column, the airbag apparatus comprising
a retainer,
the airbag mounted to the retainer,
an inflator,
a module cover,
a mounting strip extending from the retainer substantially in parallel with the axial line to be inserted into the mounting strip insertion hole, the mounting strip comprising a claw portion projecting laterally in one direction relative to an extending direction at a distal end of the mounting strip,
an urging spring for urging the airbag apparatus from the steering wheel toward an occupant,
a horn switch with contact points to move toward/away from each other by the advancement and retraction of the airbag apparatus, and
a snap-lock mechanism as a one-touch mounting mechanism attached to the steering wheel for mounting the airbag apparatus onto the steering wheel to advance and retract in the direction of the axial line of the steering column,
wherein the snap-lock mechanism comprises a mounting strip engaging spring for engaging the claw portion, and an engaging force increasing device increasing an engaging force of the mounting strip engaging spring after having engaged the claw portion with the mounting strip engaging spring, the mounting strip engaging spring comprising a pair of parallel extending portions and a connecting portion thereof, the parallel extending portions extending substantially parallel to each other and one parallel extending portion crossing the mounting strip insertion hole,
the claw portion of the mounting strip engages the one parallel extending portion from a side opposite to the other parallel extending portion, and
the engaging force increasing device is a spacer inserted between the parallel extending portions to prevent the parallel extending portions from approaching each other so that the claw portion of the mount strip located in the mounting strip insertion hole is prevented from being removed therefrom by preventing the one parallel extending portion to move toward the other parallel extending portion.

2. The steering wheel device with the airbag according to claim 1, further comprising a protruding portion projected sideways from a side surface of the retainer,
wherein the urging spring is provided so as to urge the protruding portion.

3. The steering wheel device with the airbag according to claim 2, wherein the protruding portion is provided on the side surface of the retainer on an occupant side.

4. The steering wheel device with the airbag according to claim 1, wherein one of the parallel extending portions crosses the mounting strip insertion hole.

5. The steering wheel device with the airbag according to claim 1, wherein a plurality of the mounting strips and mounting strip engaging springs are provided at the airbag apparatus and the steering wheel, at least two of the mounting strip engaging springs contracting in opposite directions when the mounting strips are engaged with the mounting strip engaging springs.

6. The steering wheel device with the airbag according to claim 1, wherein the base of the steering wheel includes a plurality of projections around the mounting hole insertion hole to position the urging spring.

7. The steering wheel device with the airbag according to claim 1, wherein the one parallel extending portion of the mounting strip engaging spring is located at one side of the mounting strip insertion hole to move the one parallel extending portion toward the other parallel extending portion when the claw portion of the mounting strip is inserted into the mounting strip insertion hole.

8. A steering wheel device with an airbag comprising:
a steering wheel having a base with a mounting strip insertion hole, and
an airbag apparatus mounted to the base of the steering wheel so as to be capable of advancing and retracting in a direction of an axial line of a steering column, the airbag apparatus comprising
a retainer,
the airbag mounted to the retainer,
an inflator,
a module cover,
a mounting strip extending from the retainer substantially in parallel with the axial line to be inserted into the mounting strip insertion hole, the mounting strip comprising a claw portion projecting laterally in one direction relative to an extending direction at a distal end of the mounting strip,
an urging spring for urging the airbag apparatus from the steering wheel toward an occupant,
a horn switch with contact points capable of moving toward/away from each other by the advancement and retraction of the airbag apparatus, and
a snap-lock mechanism as a onetouch mounting mechanism attached to the steering wheel for mounting the airbag apparatus onto the steering wheel so as to be capable of advancing and retracting in the direction of the axial line of the steering column, wherein the snap-lock mechanism comprises a mounting strip engaging spring for engaging the claw portion, the mounting strip engaging spring comprising a pair of parallel extending portions and a connecting portion thereof, the parallel extending portions extending substantially parallel to each other and one parallel extending portion crossing the mounting strip insertion hole, the claw portion of the mounting strip is capable of engaging with the one parallel extending portion from a side opposite to the other of the parallel extending portions, and the airbag apparatus further comprises a guide shaft projecting from the retainer parallel to the mounting strip, and the base of the steering wheel includes a guide shaft insertion hole for receiving the guide shaft.

9. A steering wheel device with an airbag comprising:

a steering wheel having a base with a mounting strip insertion hole, and an airbag apparatus mounted to the base of the steering wheel so as to be capable of advancing and retracting in a direction of an axial line of a steering column, the airbag apparatus comprising a retainer, the airbag mounted to the retainer, an inflator, a module cover, a mounting strip extending from the retainer substantially in parallel with the axial line to be inserted into the mounting strip insertion hole, the mounting strip comprising a claw portion projecting laterally in one direction relative to an extending direction at a distal end of the mounting strip, an urging spring for urging the airbag apparatus from the steering wheel toward an occupant, a horn switch with contact points capable of moving toward/away from each other by the advancement and retraction of the airbag apparatus, and a snap-lock mechanism as a onetouch mounting mechanism attached to the steering wheel for mounting the airbag apparatus onto the steering wheel so as to be capable of advancing and retracting in the direction of the axial line of the steering column, wherein the snap-lock mechanism comprises a mounting strip engaging spring for engaging the claw portion, the mounting strip engaging spring comprising a pair of parallel extending portions and a connecting portion thereof, the parallel extending portions extending substantially parallel to each other and one parallel extending portion crossing the mounting strip insertion hole, the claw portion of the mounting strip is capable of engaging with the one parallel extending portion from a side opposite to the other of the parallel extending portions, and the base of the steering wheel includes a projecting shoulder with the mounting strip insertion hole therein, said projecting shoulder having an engaging spring insertion hole therein to partially cross the mounting strip insertion hole so that when the mounting strip engaging spring is disposed in the engaging spring insertion hole, one of the parallel extending portions crosses the mounting strip insertion hole to allow the mounting strip to push said one of the parallel extending portions to the other of the parallel extending portions upon insertion of the mounting strip into the mounting strip insertion hole.

10. The steering wheel device with the airbag according to claim 9, wherein the connecting portion and other ends of the parallel extending portions extend out from the engaging spring insertion hole and are overlapped with a front surface of the base member when the mounting strip engaging spring is assembled with the base.

* * * * *